United States Patent
Kim et al.

(10) Patent No.: US 10,299,298 B2
(45) Date of Patent: May 21, 2019

(54) PACKET DATA NETWORK CONNECTION PROCESS IN WIRELESS COMMUNICATION SYSTEM, AND APPARATUS FOR SAME

(71) Applicant: LG ELECTRONICS INC., Seoul (KR)

(72) Inventors: Hyunsook Kim, Seoul (KR); Jinsook Ryu, Seoul (KR); Laeyoung Kim, Seoul (KR); Jaehyun Kim, Seoul (KR); Taehun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 39 days.

(21) Appl. No.: 15/311,468

(22) PCT Filed: May 18, 2015

(86) PCT No.: PCT/KR2015/004959
§ 371 (c)(1),
(2) Date: Nov. 15, 2016

(87) PCT Pub. No.: WO2015/174803
PCT Pub. Date: Nov. 19, 2015

(65) Prior Publication Data
US 2017/0086231 A1    Mar. 23, 2017

Related U.S. Application Data (60) Provisional application No. 61/994,204, filed on May 16, 2014.

(51) Int. Cl.
*H04W 4/08* (2009.01)
*H04W 4/70* (2018.01)
(Continued)

(52) U.S. Cl.
CPC ............. *H04W 76/10* (2018.02); *H04W 4/08* (2013.01); *H04W 4/70* (2018.02); *H04W 48/02* (2013.01)

(58) Field of Classification Search
None
See application file for complete search history.

(56) References Cited

U.S. PATENT DOCUMENTS 8,566,455 B1 * 10/2013 Zhao .................... H04W 76/10
709/227
2012/0008554 A1    1/2012 Kim et al.
(Continued)

FOREIGN PATENT DOCUMENTS

WO    2013105817 A1    7/2013
WO    2014069925 A1    5/2014
WO    2014073866 A1    5/2014

OTHER PUBLICATIONS

NTT DoCoMo, KDDI: "Discussion of Group-specific Congestion Control", 3GPP SA WG2 Meeting #103, S2-141771, May 19-23, 2014.

*Primary Examiner* — Chirag G Shah
*Assistant Examiner* — Srinivasa R Reddivalam
(74) *Attorney, Agent, or Firm* — Dentons US LLP (57) ABSTRACT

Disclosed is a method for performing a packet data network (PDN) connection process by a user equipment in a wireless communication system, the method comprising the steps of: transmitting a first PDN connection request to a mobility management entity (MME); and receiving from the MME a response to the first PDN connection request, wherein the first PDN connection request comprises information about groups, and the response to the first PDN connection request comprises information about blocked groups among a plurality of groups and/or unblocked groups among the plurality of groups.

9 Claims, 8 Drawing Sheets

(51) Int. Cl.
 *H04W 48/02* (2009.01)
 *H04W 76/10* (2018.01)

(56) References Cited

U.S. PATENT DOCUMENTS

| | | | |
|---|---|---|---|
| 2013/0051231 A1* | 2/2013 | Cai | H04W 28/22 370/230 |
| 2013/0155948 A1* | 6/2013 | Pinheiro | H04W 76/10 370/328 |
| 2013/0272207 A1* | 10/2013 | Morita | H04W 76/18 370/328 |
| 2014/0198637 A1* | 7/2014 | Shan | H04W 52/243 370/229 |
| 2015/0289224 A1* | 10/2015 | Kabadi | H04L 65/1016 370/328 |
| 2016/0066231 A1* | 3/2016 | Zembutsu | H04W 76/10 370/331 |

* cited by examiner

Group-specific congestion control (a)

APN-based congestion control (b)

PACKET DATA NETWORK CONNECTION PROCESS IN WIRELESS COMMUNICATION SYSTEM, AND APPARATUS FOR SAME

This application is a National Stage Application of International Application No. PCT/KR2015/004959, filed on May 18, 2015, which claims the benefit of U.S. Provisional Application No. 61/994,204, filed on May 16, 2014, all of which are hereby incorporated by reference in their entirety for all purposes as if fully set forth herein.

TECHNICAL FIELD

The following description relates to a wireless communication system, and more particularly, to a PDN (Packet Data Network) connection procedure and apparatus therefor.

BACKGROUND ART

Machine Type Communications (MTC) means a communication scheme including one or more machines, and may be also referred to as Machine-to-Machine (M2M) communication or object communication. Here, a machine means an entity that does not require direct manipulation or intervention of a user. For example, not only a device such as a meter or a vending machine, including a mobile communication module but also a User Equipment (UE) such as a smartphone capable of automatically accessing a network without user manipulation or intervention to perform communication may correspond to one example of the machine. These various examples of machines are referred to as MTC devices or UEs in the present specification. That is, MTC means communication performed by one or more machines (i.e., MTC devices) without human manipulation/intervention.

MTC may include communication between MTC devices (e.g., Device-to-Device (D2D) communication) and communication between an MTC device and an MTC Application Server (AS). Examples of communication between an MTC device and an MTC Application Server (AS) may include communication between a vending machine and a server, communication between a POS (Point of Sale) device and a server, and communication between an electricity, gas or water meter and a server. In addition, MTC-based applications may include security, transportation, healthcare and the like.

An MTC device stands by in a state of not establishing a connection for a data transmission and reception to minimize power consumption, and may then establish the connection in response to a request or an instruction. Such a request or instruction may be referred to as an MTC device triggering message.

DISCLOSURE OF THE INVENTION

Technical Task

The technical task of the present invention is to provide a method of processing an access of a UE corresponding to a plurality of groups in a case of applying a group specific congestion control.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of performing a PDN connection procedure by a User Equipment (UE) in a wireless communication system, the method including a first PDN connectivity request to a Mobility Management Entity (MME); and receiving a response to the first PDN connectivity request from the MME, wherein the first PDN connectivity request includes information on a group, and wherein the response to the first PDN connectivity request includes at least one of an information on a blocked group(s) and an information on a non-blocked group(s) among a plurality of groups.

The method may further include, if the PDN connectivity request is rejected and the UE corresponds to a group other than the blocked group(s) as well, transmitting a second PDN connectivity request to the MME.

The second PDN connectivity request may include information on a group other than the blocked group(s).

The groups may be classified by services provided by an Access Point Name (APN).

The groups may be different per service provided by the UE.

The group may be a same group included in subscriber information.

In a $2^{nd}$ technical aspect of the present invention, provided herein is a method of performing a PDN connection procedure by a Mobility Management Entity (MME) in a wireless communication system, the method including, receiving a first PDN connectivity request from a User Equipment (UE); and transmitting a response to the first PDN connectivity request to the UE, wherein the first PDN connectivity request includes information on a group and wherein the response to the first PDN connectivity request includes at least one of an information on a blocked group(s) and an information on a non-blocked group(s) among a plurality of groups.

The method may further include, if the MME rejects the PDN connectivity request and the UE corresponds to a group other than the blocked group(s) as well, receiving a second PDN connectivity request from the MME.

The second PDN connectivity request may include information on a group other than the blocked group(s).

The MME may determine whether to reject a PDN connectivity request using information on a group included in the first PDN connectivity request.

The groups may be classified by services provided by an Access Point Name (APN).

The groups may be different per service provided by the UE.

The group may be a same group included in subscriber information.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help in understanding of the present invention. These specific terms may be replaced with other terms within the scope and spirit of the present invention.

In some instances, to prevent the concept of the present invention from being ambiguous, structures and apparatuses of the known art will be omitted, or will be shown in block diagram form based on main functions of each structure and apparatus. In addition, wherever possible, like reference numerals denote the same parts throughout the drawings and the specification.

The embodiments of the present invention can be supported by standard documents disclosed for at least one of wireless access systems including Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by these specifications. Further, all terms as set forth herein can be explained by the standard specifications.

Techniques described herein can be used in various wireless access systems. For clarity, the present disclosure focuses on 3GPP LTE and LTE-A systems. However, the technical features of the present invention are not limited thereto.

Terms used in the following description are defined as follows.

UMTS (Universal Mobile Telecommunication System): $3^{rd}$ generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE/UTRAN, which is evolved from UMTS.

NodeB: Base station of a GERAN/UTRAN, which is installed outdoors and has a coverage corresponding to a macro cell.

eNodeB: Base station of E-UTRAN, which is installed outdoors and has a coverage corresponding to a macro cell.

UE (User Equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device. In MTC, the term "UE" or "terminal" may refer to an MTC device.

HNB (Home NodeB): Base station of a UMTS network, which is installed outdoors and has a coverage corresponding to a macro cell.

HeNB: Base station of an EPS network, which is installed outdoors and has a coverage corresponding to a macro cell.

MME (Mobility Management Entity): Network node of an EPS network, which performs Mobility Management (MM) and Session Management (SM).

PDN-GW (Packet Data Network-Gateway)/P-GW: Network node of an EPS network, which performs UE IP address allocation, packet screening and filtering, charging data collection, etc.

SGW (Serving Gateway): Network node of an EPS network, which performs mobility anchoring, packet routing, idle mode packet buffering, a function of triggering an MME to page a UE, etc.

NAS (Non-Access Stratum): Upper stratum of a control plane between a UE and an MME, which is a functional layer for exchanging signaling and traffic messages between a UE and a core network in an LTE/UMTS protocol stack. Major functions thereof are to support UE mobility and to support a session management procedure for establishing and maintaining an IP connection between a UE and a PDN GW.

PDN (Packet Data Network): Network on which a server supporting a specific service (e.g., MMS (Multimedia Messaging Service) server, WAP (Wireless Application Protocol) server or the like) is located.

PDN connection: Logical connection between a UE and a PDN, represented by a single IP address (e.g., single IPv4 address and/or single IPv6 prefix).

RAN (Radio Access Network): Unit including a NodeB, an eNodeB and a Radio Network Controller (RNC) for controlling the NodeB and the eNodeB in a 3GPP network, which is present between UEs and provides a connection to a core network.

HLR (Home Location Register)/HSS (Home Subscriber Server): Database having subscriber information in a 3GPP network. The HSS can perform functions such as configuration storage, identity management and user state storage.

PLMN (Public Land Mobile Network): Network configured for the purpose of providing mobile communication services to individuals. This network can be configured per operator.

MTC (Machine Type Communications): Communication performed by a machine without a user intervention.

MTC device: A UE for performing MTC. An MTC device can communicate with an MTC server(s) and/or other MTC device(s) through an PLMN. The MTC device may be referred to as an MTC UE, a UE used for the MTC, and a UE configured for the MTC.

MTC-IWF (MTC InterWorking Function): An Entity providing a role of a gateway enabling a transmission of a control signal or data for MTC through a 3GPP network including an EPS or an IMS. An MTC-IWF may relay or translate a signaling protocol used in a Tsp reference point to invoke a specific function in a PLMN.

SCS (Services Capability Server): A server to be connected to a 3GPP network to communicate with an MTC device in a HPLMN (Home PLMN (Public Land Mobile Network)) and an MTC device using an MTC-IWF. A SCS provides a capability for using a single or a plurality of applications.

MTC server: A server which manages an MTC user equipment in a network. And, it can communicate with a PLMN itself or an MTC device through a PLMN. An MTC server may have an interface a MTC user can access. In addition, the MTC server may provide other servers with a service regarding MTC (as a form of an SCS), and may be an MTC Application Server (AS).

MTC application: services for applying MTC (e.g., remote meter reading, product delivery tracking, etc.)

MTC Application Server (AS): A server on a network, in which an MTC application is implemented.

MTC feature: A function of a network for supporting an MTC application. For example, MTC monitoring is a feature for preventing a loss of devices in an MTC application like remote meter reading, and a low mobility is a feature for an MTC application regarding an MTC device like a vending machine.

MTC User: A user using a service provided by an MTC server.

MTC subscriber: An entity having an access relation with a network operator, and providing one or more MTC user equipment with a service.

MRC Group: It shares at least one or more MTC feature, and means a group of an MTC user equipment belonging to an MTC subscriber.

Evolved Packet Core (EPC)

Figure 1:
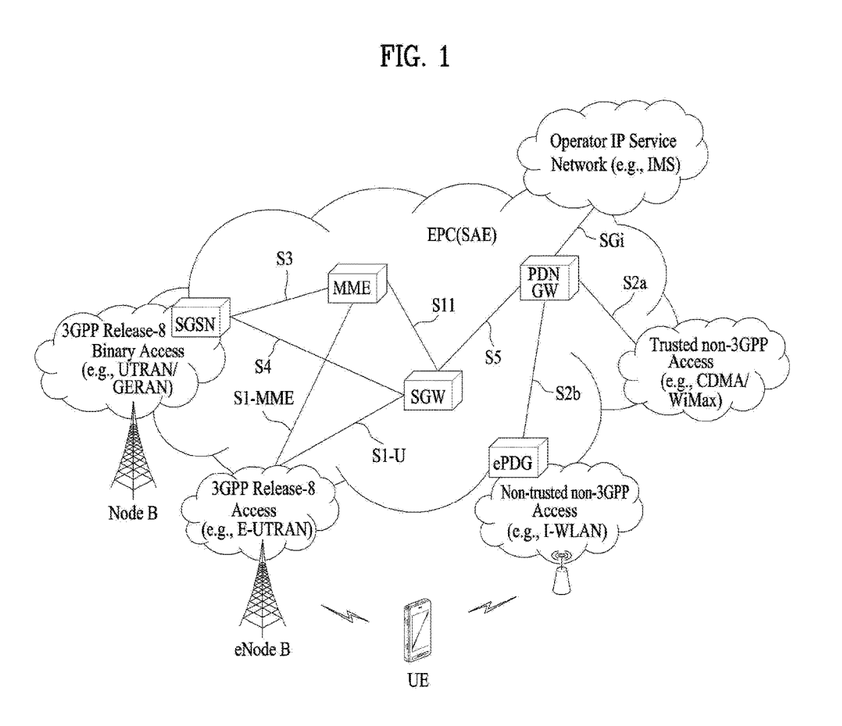
FIG. 1 is a diagram for a schematic structure of an Evolved Packet System (EPS) including an Evolved Packet Core (EPC).

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
|---|---|
| S1-MME | Reference point for the control plane protocol between E-UTRAN and MME |

TABLE 1-continued

| Reference point | Description |
| --- | --- |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
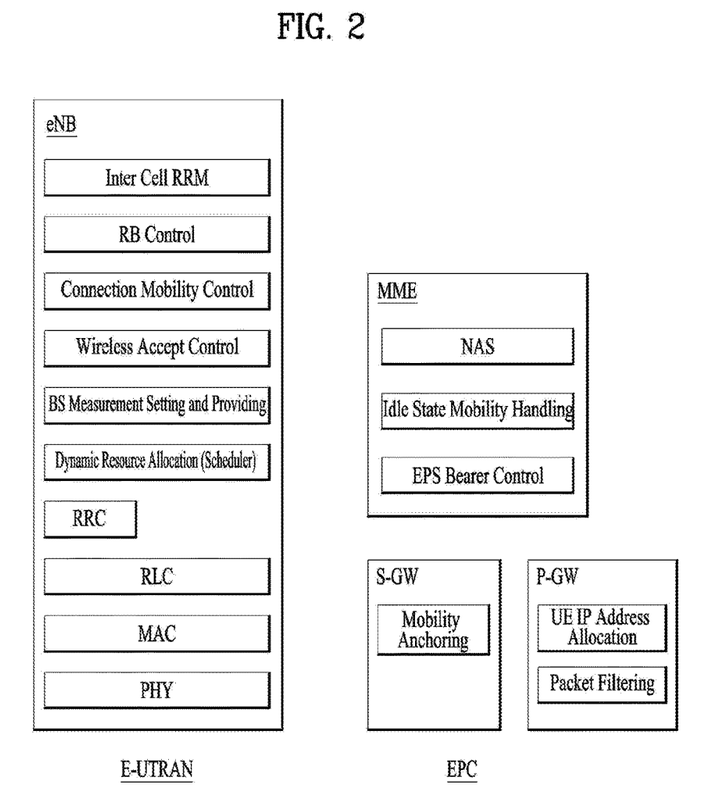
FIG. 2 is a diagram for an example to illustrate architectures of a general E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
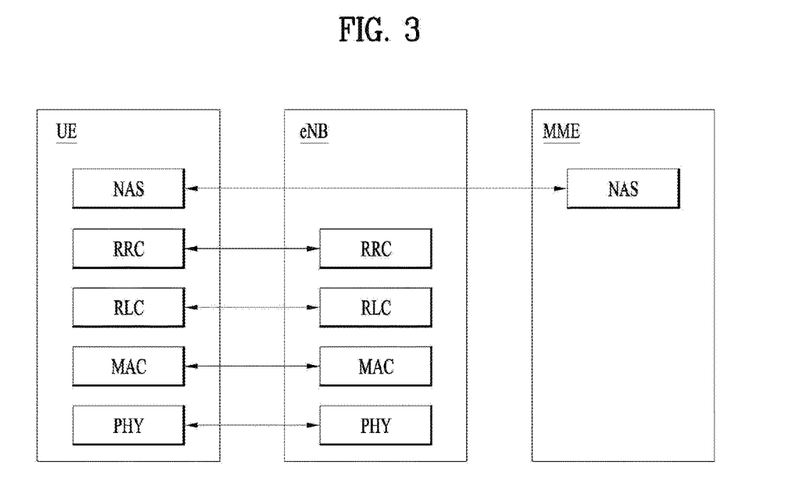
FIG. 3 is a diagram for an example to illustrate a structure of a wireless interface protocol in a control plane.
Figure 4:
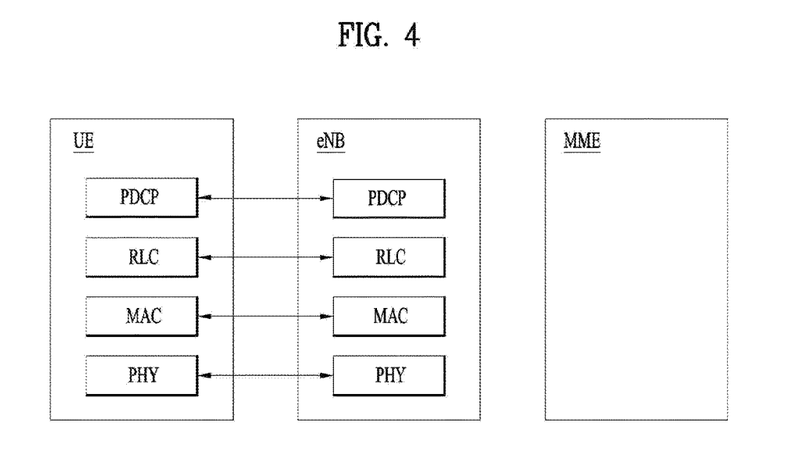
FIG. 4 is a diagram for an example to illustrate a structure of a wireless interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
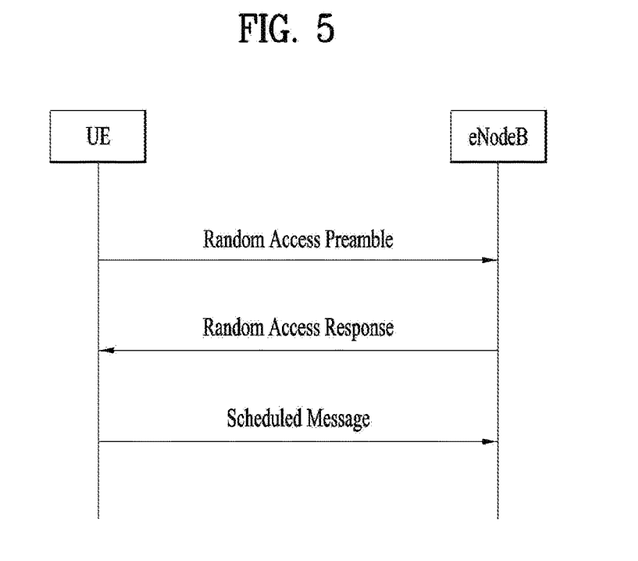
FIG. 5 is a flowchart to describe a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
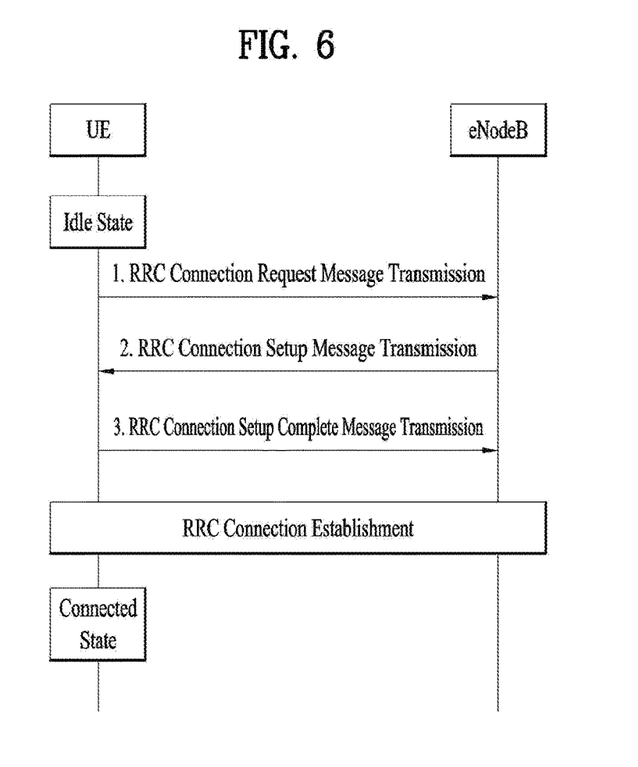
FIG. 6 is a diagram to illustrate a connection process on an RRC layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNodeB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode FIG. 1 is a diagram for one example of a configuration of a wireless LAN system.

Group-Specific Congestion Control

A multitude of devices can subscribe a specific service. In this case, misbehavior of a multitude of the devices may cause congestion of a network. For example, a case for a multitude of devices to repeatedly make attach requests may correspond to such a case. If a server providing a specific service in an MTC goes down, MTC devices may continuously make reboot requests and re-access requests. For another example, a large amount of signaling overhead may occur with respect to a specific subscription/service.

Figure 7:
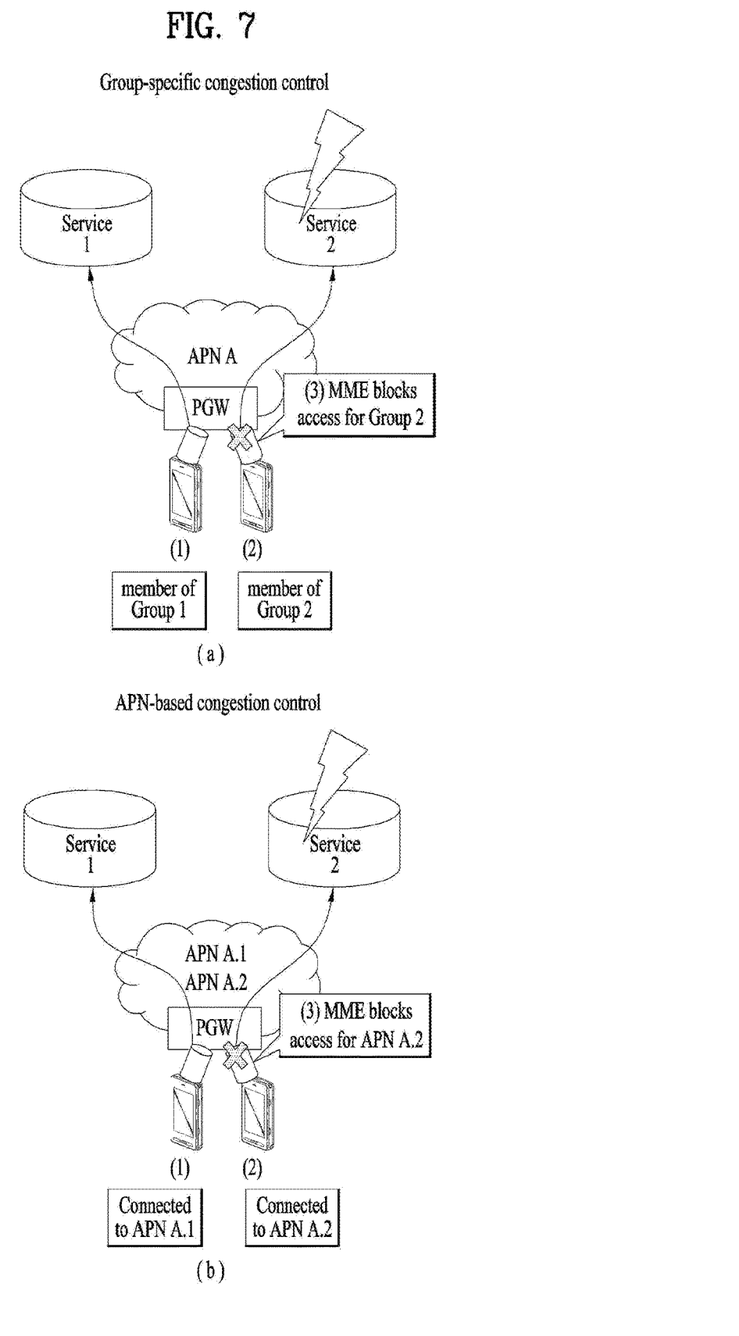
FIG. 7 and FIG. 8 are diagrams describing a congestion control method.

As a related art method for resolving such a congestion situation, a group-specific congestion control, an APN-based congestion control, or the like may be performed (cited in part from SA WG2 Meeting #103, S2-141771, Discussion of Group-specific Congestion Control, and NTT DOCOMO). FIG. 7 (*a*) illustrates an example of a group-specific congestion control and FIG. 7 (*b*) illustrates an example of an APN-based congestion control. Referring to FIG. 7 (*a*), a UE may be provided with service 1 or service 2 from a single APN A. Moreover, the UE may be included in at least one of group 1 or group 2, and the groups may be classified by services. If a problem occurs in a server providing service 2, an MME may perform a congestion control by blocking an access of a member of group 2. In FIG. 7 (*b*), services may be classified by APNs, and if a problem occurs in a server providing service 2, an MME may perform a congestion control by blocking an APN (APN A.2) corresponding to service 2.

Figure 8:
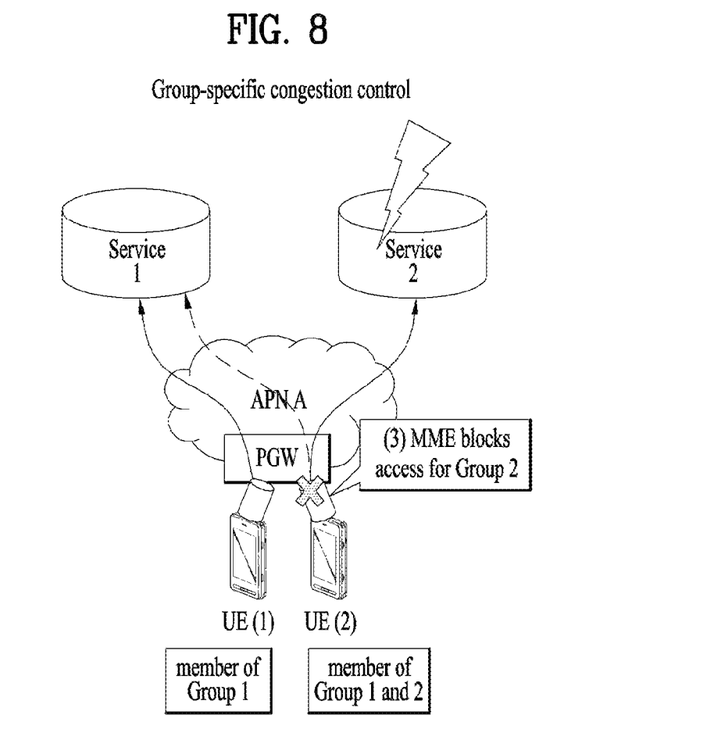

Among the aforementioned methods, particularly in case of the group-specific congestion control, a problem may occur if a single user equipment corresponds to (or is included in) a plurality of groups. This will be described with reference to FIG. 8. In FIG. 8, it is assumed that a UE 1 belongs to a group 1, and a UE 2 belongs to the group 1 and a group 2 simultaneously. The group 1 is associated with service 1, and the group 2 is associated with service 2. In this situation, if a problem occurs in a server providing service 2, an MME may block an access of a user equipment belonging to the group 2. Hence, an access of the UE 2 for the service 2 is blocked. Yet, in this case, the MME blocks an access of a UE based on a group, and thus an access of the UE 2 for the service 1 is blocked as well. Since a server providing service 1 has no problem, it is inefficient not to allow an access to a service corresponding to a non-blocked group based only on the fact that the UE 2 belongs to a blocked group(s). Hereinafter, embodiments of the present invention to solve such problems will be described.

Embodiment 1

Figure 9:
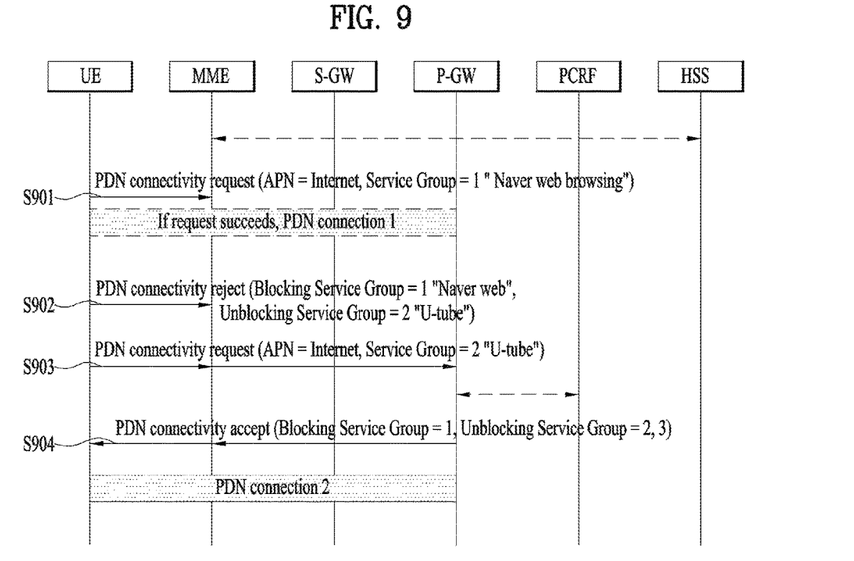
FIG. 9 and FIG. 10 are diagrams to describe a PDN connection procedure according to an embodiment of the present invention.

FIG. 9 illustrates an example of a PDN connection procedure according to an embodiment 1. Referring to FIG. 9, in a step S901, a user equipment may transmit a first PDN connectivity request for an access to a network/specific service to an MME. This PDN connectivity request may be generated together with an initial attach procedure or independently.

The MME may determine whether to reject a PDN connectivity request using information on a group included in the first PDN connectivity request. Namely, a network node (e.g., MME) controlling a UE's access may determine "Accept" or "Reject" based on subscriber information and control information (e.g., a configuration for blocking service, an operator management command, or a network congestion situation, etc.) of an operator/network, and may inform the user equipment of a result of the determination.

The user equipment may receive a response to the first PDN connectivity request from the MME. Herein, the first PDN connectivity request may include information on a group. In other words, the response may include information indicating a request for a service corresponding to a service group 1. In comparison with existing a related art PDN request including information such as APN, PDN Type, Protocol Configuration Options, Request Type and the like, the information on the group is further included. And, the response to the first PDN connectivity request may include information on a blocked group among a plurality of groups and/or information on a non-blocked group among a plurality of the groups. For example, like a step S902 shown in FIG. 9, a PDN connectivity reject, which is one of responses to the PDN connectivity request, may include information on a blocked group(s) (e.g., Blocking service group=1 "naver service") and information on a non-blocked group (e.g., Unblocking service group=2 "U-tube"). In detail, the i) information on a service group currently receiving/not receiving a blocking control on a network irrespective of the request, ii) information on a service group currently receiving/not receiving a blocking control on a network irrespective of UE's subscriber information, iii) information on a service group currently receiving/not receiving a blocking control on a network among groups subscribed in the UE's subscriber information, and so on may be included in the response to the PDN connectivity request by the MME. These examples may be transmitted to the UE irrespective of whether the PDN connectivity request is accepted or rejected, and a back-off timer may be used in a manner of running parallel with/being combined with the related art.

After receiving the response to the PDN connectivity request, the UE may recognize a blocked service group on the network. The UE may evaluate a blocked service based on the received response. That is, the UE determines whether to wait for or attempt a prescribed service request, and the like. The recognized items may be delivered to an application layer, and then utilized for user interaction. In particular, not only another request is attempted by information configured in the UE, but also other requests may be attempted by the user interaction.

Furthermore, if the PDN connectivity request is rejected and the UE corresponds to a group other than the blocked group(s) as well, the UE may transmit a second PDN connectivity request to the MME. Herein, the second PDN connectivity request includes information on the group other than the blocked group(s). Namely, the UE may attempt a non-blocked service request through the network. If a traffic for a service is generated from an application layer, the UE directly/indirectly delivers information on a presence or non-presence of the traffic corresponding to a prescribed service and the like to an NAS layer. The UE's NAS layer transmits a PDN connection establishment request message for another service based on the informations received in the previous step to the network.

In the procedure shown in FIG. 9, a UE may recognize a service group, to which a current service can be requested for a specific service, based on the information received from the application layer and pre-configuration information received from the operator/network, before transmitting a PDN connectivity request. For example, in case of an app number 'xx and yy' received from the application layer, it may be determined to be mapped to the service group 1 "Naver web browsing service".

In the aforementioned description, the groups may be classified by services provided by the APN. (1:1 mapping with a group defined in subscriber information is not mandatory.) That is, a multitude of service groups may be created according to a type of a service providable through a single APN. A service group is not simply limited to a specific application of a user equipment (e.g., a specific app of a smart phone), but can be classified according to a specific service. This is because, for example, to access a Naver server, not only a Naver app but also a Google browsing app can be used. Namely, not only a single app may become a single service group, but also a multitude of apps may become a single service group.

Or, a group may be the same as included in subscriber information. Or, a group may be different per service provided by a UE. For example, a single UE may provide both a service as a vending machine and a service as a ticketing machine, and in this case, a group may be preconfigured according to a type of a service which can be provided by the UE. And, groups may be classified according to user authority. For example, if a VPN service access is attempted, a user of an individual UE may belong to several groups. That is, in case that a user simultaneously has a general authority as a member of one company and a specific user authority as a member of a specific department or a specific community, the user may be classified according to making a request with a prescribed membership for each individual request.

Meanwhile, in the aforementioned description, a service group participant may be a user equipment/user desiring to receive/receiving a specific service currently provided by a specific APN. The service group participant is different from a CSG member used in a femto cell. Whereas the service group participant is formed dynamically according to a specific service a user equipment currently desires to receive/is receiving, CSG is fixed into subscriber information and may be meaningful only in a cell supportive of a corresponding CSG group.

Low Access Priority of the related art may be regarded as a group defined by an operator/network, the group may be divided into a group applying the low access priority or a group capable of applying dual priority. And, the network controls an access depending on what kind of a relative priority is requested by being specified on requesting a same service. Namely, it seems that there is a relative priority between a group having set a low access priority and a group not having set the low access priority. And, the relative priority may be regarded as already specified in a request message. Namely, the aforementioned embodiment 1 can be distinguished from the related art Low Access Priority in that a priority does not exist between service groups. Since an access grant/reject of a service group is determined according to a network environment, a prescribed service group may not be prioritized in a prescribed environment. The low access priority technology is not enough to solely reflect a service-related network disorder/congestion situation which is changing gradually and further dynamically. In particular, it may cause a problem to a service operation if a relative priority with another service with respect to a specific service is fixedly determined. Hence, a network access for a specific service group should be controlled by reflecting a network situation at a specific timing. Regarding another difference, a change in a low access priority setting is a change in a relative priority in response to a "request" for a same service, but a change in a service group setting is a request for an allowable "different" service. In viewpoint of PDN connection establishment, the change in the service group setting attempts another PDN connection establishment, whereas the change in the low access priority setting attempts the same PDN connection establishment.

Embodiment 2

In comparison to the embodiment 1, an embodiment 2 is a scheme of further emphasizing a control of a network. This is described with reference to FIG. 10.

Figure 10:
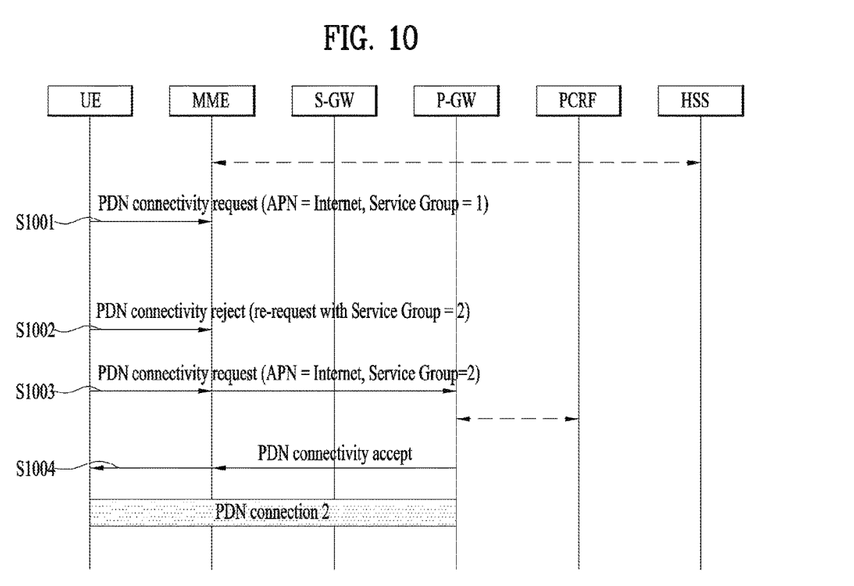

In a step S1001, a UE which is a participant in a multitude of service groups may request a PDN connectivity to access a network or for a specific service. In doing so, information indicating that a service corresponding to a service group 1 is requested may be included. A PDN connectivity request may be generated together with an initial attach procedure or independently. Before the step S1001, the UE may recognize a current service group available for a service request for a specific service according to information received from an application layer and pre-configuration information received from an operator/network. For example, an app number "xx" received from the application layer may be determined as mapped to a service group 1, and an app number "yy" may be determined as mapped to a service group 2.

A network node controlling the access of the UE (e.g., MME) may determine an acceptance or a rejection based on subscriber information and control information of an operator/network (e.g., a configuration for a blocking service, an operator management command, or a network congestion situation, etc.), and may inform the user equipment of a corresponding result. In the present invention, it is assumed that the MME has configured app information capable of providing a specific service and mapping information between service groups. Hence, in a step S1002, in case that the network node transmits "Reject" to the user terminal, a new request/instruction may be sent together in order for the user terminal to make a re-request by changing a service group as a subsequent step after receiving a reject message. Namely, this is to perform a control directly in the network rather than an aggressive evaluation/determination in the user equipment.

In a step S1003, the user equipment may passively make a re-request by changing a service group in response to an instruction of the network. Herein, a changed service group information from the network may be delivered to an application layer and then utilized for user interaction. Namely, another request may be attempted by the user interaction as well as further request may be attempted according to information configured in the UE.

Thereafter, the user equipment may receive a PDN connectivity accept in a step S1004.

Embodiment 3

In an attach procedure, together with an attach request, a UE may transmit an information i) on a group to which a specific service/application desired to be serviced belongs, an information ii) on a specific service/application desired to be serviced among services requested or provided by a default APN and the like to a network.

A network node (e.g., an MME) controlling a UE's access informs the user equipment of "attach accept" or "attach reject" based on subscriber information and an operator's control. In case of the attach reject, a value of an MM backoff timer of the related art is given so as to block a reattempt for a predetermined time. Herein, for a determination of the attach reject/accept and/or a determination of the value of the MM backoff timer, the informations "i)" and "ii)" received together with the attach request and an information on association/relation of a service with a preset group may be usable.

The network node may transmit at least one of the following informations to the user equipment through the network. The following information may be transmitted directly, or by an implicative method that can be deduced from a combination of other informations in the UE.

In case of transmitting "attach accept", ii) information indicating whether a group blocking control is currently received on the network, iii) information on a group/service currently receiving a group blocking control on the network irrespective of subscriber information of the UE, and iv) information on a group/service currently receiving a group blocking control on the network among groups subscribed in the subscriber information of the UE (i.e., intended to send additional information indicating that a service currently provided to another different group is blocked despite a case of transmitting an attach accept in response to a current request, and intended to utilize for another group/service request item after the attach) may be transmitted.

In case of transmitting "attach reject", i) information indicating whether a group blocking control is currently received on the network, ii) information on a group/service currently receiving a group blocking control on the network irrespective of subscriber information of the UE, and iii) information on a group/service currently not receiving a group blocking control on the network among groups subscribed in the subscriber information of the UE (i.e., intended to send additional information indicating that a service currently provided to another group is not blocked despite a case of transmitting an attach reject in response to a current request, and intended to utilize for another group/service request item despite a case of receiving a reject message) may be transmitted. The above examples of the informations may be transmitted to a UE in any case irrespective of an accept/reject message.

The UE having received the attach or reject may recognize a blocked group/service on the network. The UE may evaluate the blocked group/service based on the information received from the network in the above step. The UE determines whether to wait for or attempt a prescribed group/service request. For example, even if the UE receives an attach reject for a prescribed group/service and information on an MM backoff timer, the UE determines that an attach request message for the prescribed group/service can be transmitted to the network despite that the backoff timer value has not expired yet.

Thereafter, the UE may attempt an access for making a request for a non-blocked group/service to the network. If traffic for a service is generated from an application layer, the UE directly/indirectly delivers information indicating whether the traffic corresponds to a prescribed application/group/service to a NAS layer. The NAS layer of the UE may transmit an attach request message for a specific group/service to the network based on the informations received in the previous step.

The aforementioned description may be extensively applicable to various procedures like TAU affected by an MM backoff timer, and may be also extensively applicable to a procedure affected by an SM backoff timer.

Figure 11:
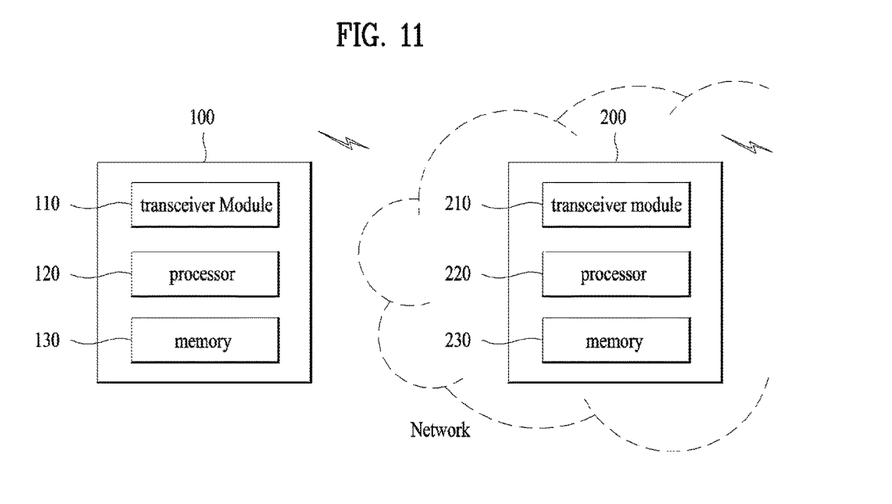
FIG. 11 is a diagram illustrating configurations of a user equipment device and a network node device according to one example of the present invention.

FIG. 11 is a diagram to illustrate a configuration of a preferable embodiment for a user equipment apparatus and a network node apparatus according to one example of the present invention.

Referring to FIG. 11, a user equipment device 100 according to the present invention may include a transceiver module 110, a processor 120, and a memory 130. The transceiver module 110 may be configured to transmit various signals, data and informations to an external device, and receive various signals, data and informations from the external device. The user equipment device 100 may be connected to the external device by wire and/or wireless. The processor 120 may control overall operations of the user equipment device 100, and may be configured to enable the user equipment device 100 to perform a function of operating information to be transceived with the external device. And, the processor 120 may be configured to perform a user equipment operation proposed by the present invention. The memory 130 may store the operated information and the like for a predetermined time, and may be substituted with a component such as a buffer (not shown) and so on.

Referring to FIG. 11, a network node device 200 according to the present invention may include a transceiver module 210, a processor 220, and a memory 230. The transceiver module 210 may be configured to transmit various signals, data and informations to an external device, and receive various signals, data and informations from the external device. The network node device 200 may be connected to the external device by wire and/or wireless. The processor 220 may control overall operations of the network node device 200, and may be configured to enable the network node device 200 to perform a function of operating information to be transceived with the external device. And, the processor 220 may be configured to perform a network node operation proposed by the present invention. The memory 230 may store the operated informations and the like for a predetermined time, and may be substituted with a component such as a buffer (not shown) and so on.

Moreover, the detailed configurations of the user equipment device 100 and the network device 200 as the above may be embodied in a manner of independently applying the aforementioned features described in the various embodiments of the present invention or simultaneously applying at least two of the embodiments, and redundant description shall be omitted for clarity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

The detailed description of the preferred embodiment of the present invention disclosed in the above are provided so as to enable the present invention to be implemented and embodied by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although various embodiments of the present invention as the above are described centering on a 3GPP system, they are applicable to various mobile communication systems in the same manners.

What is claimed is:

1. A method for performing a Packet Data Network (PDN) connection procedure by a User Equipment (UE) in a wireless communication system, the method comprising:
    transmitting, to a Mobility Management Entity (MME), a first PDN connectivity request including information on a first group;
    receiving, from the MME, a response to the first PDN connectivity request,
    wherein the response to the first PDN connectivity request includes response information on a plurality of groups divided into one or more blocked groups and one or more non-blocked groups,
    wherein the UE belongs to the plurality of groups, and
    wherein the one or more blocked groups including the first group and the one or more non-blocked groups including a second group are configured by the MME; and
    transmitting, to the MME, a second PDN connectivity request including information on the second group based on the response information, when the first PDN connectivity request is rejected.

2. The method of claim 1, wherein the plurality of groups are classified by services provided by an Access Point Name (APN).

3. The method of claim 1, wherein the plurality of groups are different per service provided by the UE.

4. The method of claim 1, wherein the first group is the same group included in subscriber information.

5. A method for performing a Packet Data Network (PDN) connection procedure by a Mobility Management Entity (MME) in a wireless communication system, the method comprising:
    receiving a first PDN connectivity request including information on a first group from a User Equipment (UE);
    transmitting a response to the first PDN connectivity request to the UE,
    wherein the response to the first PDN connectivity request includes response information on a plurality of groups divided into one or more blocked groups and one or more non-blocked groups,
    wherein the UE belongs to the plurality of groups, and
    wherein the one or more blocked groups including the first group and the one or more non-blocked groups including a second group are configured by the MME; and
    receiving, from the UE, a second PDN connectivity request including information on the second group based on the response information, when the first PDN connection request is rejected.

6. The method of claim 5, wherein the MME determines whether to reject a PDN connectivity request based on the information on the first group included in the first PDN connectivity request.

7. The method of claim 5, wherein the plurality of groups are classified by services provided by an Access Point Name (APN).

8. The method of claim 5, wherein the plurality of groups are different per service provided by the UE.

9. The method of claim 5, wherein the first group is the same group included in subscriber information.

* * * * *